United States Patent [19]

Zorbalas

[11] 4,393,421
[45] Jul. 12, 1983

[54] RAPID STEPPING OF A MOVING RECORDED MEDIUM

[75] Inventor: George S. Zorbalas, Cherry Hill, N.J.

[73] Assignee: RCA Corporation, New York, N.Y.

[21] Appl. No.: 201,055

[22] Filed: Oct. 27, 1980

[51] Int. Cl.³ .............................................. G11B 19/26
[52] U.S. Cl. ..................................................... 360/73
[58] Field of Search ........................................... 360/73

[56] References Cited

U.S. PATENT DOCUMENTS 4,165,522  8/1979  Moller ................................... 360/73
4,308,560 12/1981  Ravizza ................................. 360/73
4,322,747  3/1982  Dischert et al. ...................... 360/73

Primary Examiner—Robert S. Tupper
Attorney, Agent, or Firm—E. M. Whitacre; W. H. Meise; H. I. Steckler

[57] ABSTRACT

A recorded medium moving at some operational velocity is rapidly stepped to advance or retard the position thereof by a preselected time segment relative to a reference clock and the stepping cycle is completed simultaneously with the recorded medium being returned to its operational velocity.

8 Claims, 3 Drawing Figures

1

RAPID STEPPING OF A MOVING RECORDED MEDIUM

BACKGROUND OF THE INVENTION

The present invention relates generally to the rapid stepping of a moving recorded medium and more particularly to the advancement or retardation of correlated video information during replay. The most commonly known technique for stepping a moving recorded medium is to change the velocity of the recorded medium slightly in the sense of the desired step and then wait until that step is accomplished, at which time the recorded medium is very quickly returned to its original velocity. However, this technique is slow because of the slight change to the velocity of the recorded medium that is utilized therein.

When video information is recorded on a medium, its attributes such as color frame, monochrome frame, vertical period and etc. are disposed thereon at different frequencies which are each a multiple of a correlating frequency. By phase locking the correlating frequency during replay with an external or reference frequency, all attributes of the video information are correlated with the reference frequency. Therefore, numerous uncorrelated segments of video information are replayed when the slow technique previously mentioned is utilized to step the moving recorded medium.

SUMMARY OF THE INVENTION

A recorded medium moving at an operational velocity is rapidly stepped to either advance or retard the position thereof by a preselected time segment relative to a reference clock and the positional correction is accomplished simultaneously with the recorded medium being returned to its operational velocity at the completion of the stepping cycle. The duration of the stepping cycle corresponds with a multiple of the distance through which the recorded medium will travel during the preselected time segment at the operational velocity. In a particular embodiment, the duration of the stepping cycle corresponds with the distance through which the recorded medium would travel at the operational velocity during two periods of a recorded correlating frequency that is used in phase locking the recorded medium to a reference frequency during replay.

DESCRIPTION OF THE PREFERRED EMBODIMENTS

The rapid stepping cycle of this invention is accomplished with a control means for changing the velocity of the recorded medium from its operational level during a first interval and immediately thereafter returning the velocity of the recorded medium to its operational level during a second interval of equal duration with the first interval. Many different embodiments of the control means are possible and each such embodiment will be limited by the nature of the mechanism that is utilized to transport the recorded medium. Generally, however, all of these embodiments, either advance or retard the position of the recorded medium relative to a reference clock having a period equal to the preselected time segment. In each embodiment, the rates of velocity change during the first and second intervals are dependent on the operational velocity of the recorded medium, the duration of the preselected time segment, and the number of position increments on the recorded medium to occur during each interval with each position increment being equal to the distance through which the recorded medium would travel during the preselected time segment at the operational velocity. However, embodiments are possible wherein the rate of velocity change is either constant or variable during these intervals.

Figure 1:
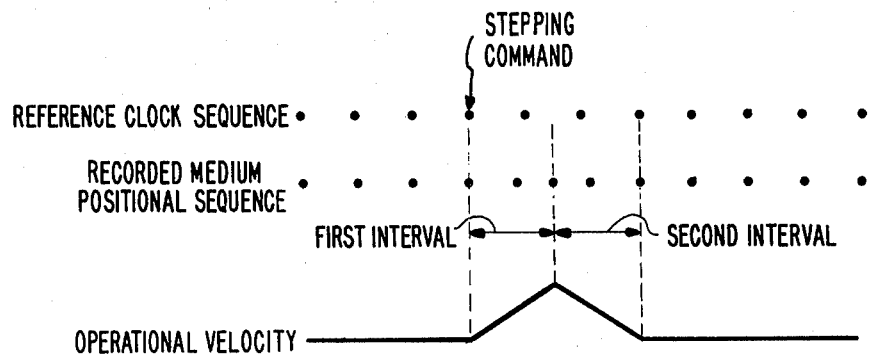
FIG. 1 illustrates a velocity profile for one embodiment of the invention wherein a moving recorded medium is advanced by one preselected time segment relative to a reference clock.
Figure 2:
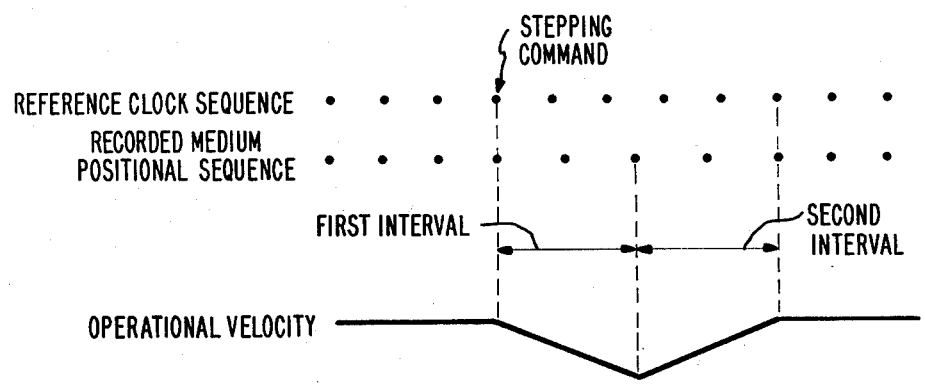
FIG. 2 illustrates a velocity profile for another embodiment of the invention wherein a moving recorded medium is retarded by one preselected time segment relative to a reference clock.

Velocity profiles relating to the preferred embodiments of the invention are shown in FIGS. 1 and 2 wherein the position of the recorded medium is advanced and retarded respectively, by one preselected time segment. In these figures, the movement of the recorded medium through a sequence of positions is correlated with the time sequence of the reference clock. Each increment in the positional sequence of the recorded medium is equivalent to the movement of the recorded medium at the operational velocity during the preselected time segment. While the recorded medium is moving at its operational velocity, a command signal is given to step the movement of the recorded medium in either of the FIG. 1 or FIG. 2 embodiments. Then the first velocity change interval of the recorded medium is commenced to start the positional sequence of the recorded medium leading the time sequence of the reference clock in FIG. 1 or to start the positional sequence of the recorded medium lagging the time sequence of the reference clock in FIG. 2. Immediately after the first interval, the second velocity change interval of the recorded medium is commenced in both FIGS. 1 and 2 during which the recorded medium is returned to its operational velocity. In both of these embodiments, the rate at which the velocity of the recorded medium changes during each of the first and second intervals is constant and therefore the acceleration or deceleration associated therewith is constant. The cumulative duration of the first and second intervals is three periods of the reference clock in FIG. 1 and five periods of the reference clock in FIG. 2. However, the rates of velocity change during these intervals are fixed to move the recorded medium through four positional sequence increments in both FIGS. 1 and 2. Therefore, the position of the recorded medium is advanced in FIG. 1 and retarded in FIG. 2 by one positional sequence increment which is equivalent to the preselected time segment or period of the reference clock. The magnitudes of acceleration (a) and deceleration (d) during the first and second velocity change intervals in FIGS. 1 and 2 are equal and can be derived mathematically in accordance with the following equation:

$$a \text{ or } d = V_o/T(1/K)^2$$

wherein
  T is the preselected time segment;
  $V_o$ is the operational velocity; and K is the number of reference clock periods which occur during each of the first or second velocity change intervals.

Depending on the desired application, the duration of the stepping cycle could be shorter or longer than shown in FIG. 1 or 2. The preselected time segment is determined in accordance with the magnitude of the positional increment through which the recorded medium is to be stepped. Also, the recorded medium could be either advanced or retarded during the stepping cycle by a multiple of the preselected time segment relative to the reference clock. Furthermore, although the recorded medium rate of velocity change is constant during the first and second intervals of the stepping cycle in the embodiments of FIGS. 1 and 2, it could be variable in other embodiments.

In video recording, attributes such as color frame, monochrome frame, vertical period and etc. are often correlated by disposing them on the recorded medium at different frequencies which are each a multiple of a recorded correlating frequency. Furthermore, the recorded correlating frequency may then be phased locked to an external or reference signal of the same frequency when the recorded medium is replayed, to thereby correlate the information on the recorded medium with the information on any other recorded medium that is phase locked with the reference signal during replay. It frequently becomes necessary to either advance or retard one of the video attributes on the recorded medium relative to the reference clock while the recorded medium is phase locked with the reference signal and moving at its replay velocity. Because the frequency of the reference signal and the recorded correlating frequency are the same and the video attributes are disposed on the recorded medium at multiples of the recorded correlating frequency, the period of the reference clock can be any submultiple of the reference signal period. The control means described previously can be readily adapted for this purpose by utilizing the period of the reference clock as the preselected time segment and the recorded correlating freqency to count the positional segments on the recorded medium. Of course, the number of periods of the reference clock during the stepping cycle will vary depending on which video attribute is to be stepped.

Figure 3:
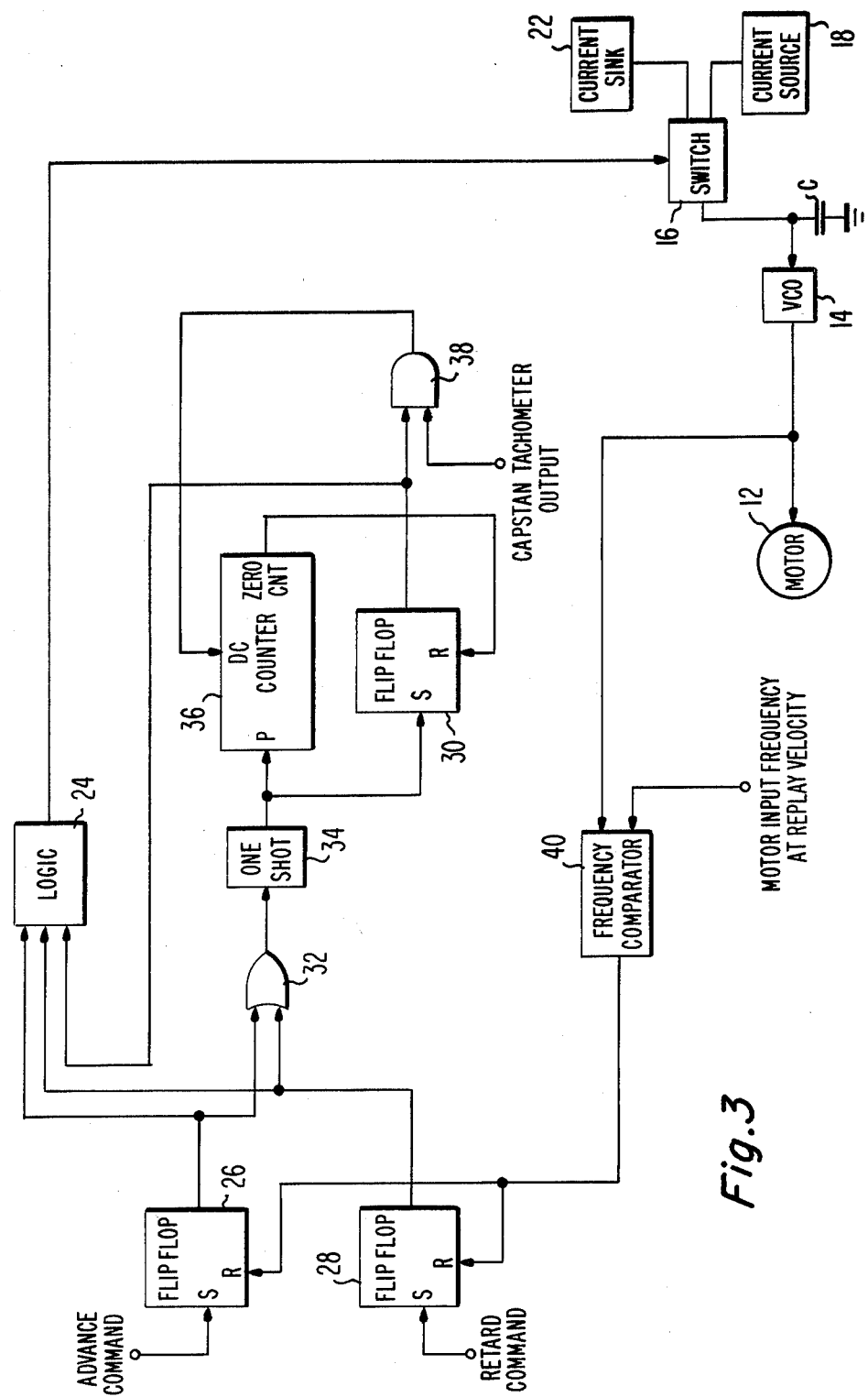
FIG. 3 is a block diagram of a control means for deriving velocity profiles similar to those of FIGS. 1 and 2 in a video tape recorder.

One arrangement of the control means that could be utilized in a video tape recorder to drive the tape through velocity profiles similar to those of FIGS. 1 and 2 is shown in the block diagram of FIG. 3. Movement of the tape can only be controlled through its transport mechanism which may be structured in any conventional manner within the scope of this invention. A frequency controlled DC motor 12 is included in FIG. 3 because that type of motor is found in the capstan drive transport mechanism of present day tape record and replay systems. In these transport mechanisms, the capstan includes a tachometer (not shown) which generates a fixed number of pulses during each revolution of the capstan and the travel parameters of the tape such as length or velocity, are derived by counting these pulses.

The speed of motor 12 is directly proportional to the frequency of its input signal which is derived from a voltage controlled oscillator (VCO) 14 having an output frequency that is proportional to its input voltage level. During the stepping cycle, the input to VCO 14 is the voltage level across a capacitor C which is either being charged or discharged through a switch 16 by a current source 18 or a current sink 22, respectively, during the first and second intervals of the velocity profile. Since motor 12 drives a tape transport mechanism, the magnitude of current source 18 and current sink 22 determines the rates at which the tape is either accelerated or decelerated respectively, during those velocity profile intervals.

Switch 16 has single pole, double throw characteristics in that it is controllable to apply either current source 18 or current sink 22 to the capacitor C. A logic network 24 enables and controls switch 16 throughout the stepping cycle in accordance with the output levels of flip-flops 26, 28 and 30. Advance and retard commands are separately applied to the set inputs of flip-flops 26 and 28 respectively, and the output levels of these flip-flops are also applied separately to the inputs of an OR gate 32. The output level of OR gate 32 is applied to the trigger input of a one-shot multivibrator 34 from which the output level is applied to both the set input of flip-flop 30 and the preset input of a counter 36. The output level of flip-flop 30 is also applied to one input of an AND gate 38 and the capstan tachometer output is applied to the other input thereof. The output level of AND gate 38 is applied to the down count input of counter 36 from which the zero count output level is applied to the reset input of flip-flop 30. The output frequency of VCO 14 and a reference frequency corresponding to the input frequency of the motor when the tape is moving at its replay velocity are separately applied to the inputs of a frequency comparator 40 from which the output level is applied to the reset inputs of flip-flops 26 and 28.

Operation of the control means in FIG. 3 will be explained for a stepping cycle wherein the moving tape is advanced by some preselected time segment relative to the reference clock. When the advance command is applied to flip-flop 26, it applies a high output to OR gate 32 and logic 24. OR gate 32 then triggers one-shot multivibrator 34 which sets flip-flop 30 and presets counter 36. Consequently, flip-flop 30 applies a high output to both logic 24 and AND gate 38 so that counter 36 starts to count down simultaneously with switch 16 being enabled to apply current source 18 to capacitor C. The down count of counter 36 is fixed at the number of capstan tachometer pulses that correspond to one period of the recorded correlating frequency and when the zero count of counter 36 is reached, flip-flop 30 is reset to both stop the count through AND gate 38 and change the condition of the switch 16 through logic 24. Due to this change in condition of switch 16, current sink 22 is applied to capacitor C simultaneously with current source 18 being disconnected therefrom to terminate the first velocity profile interval and start the second velocity profile interval. Thereafter, the frequency output from VCO 14 returns to its magnitude at the replay velocity of the tape when the output from frequency comparator 40 resets flip-flop 26 to terminate the stepping cycle by disabling switch 16 through logic 24. Except for logic 24 controlling switch 16 so that current sink 22 and current source 18 are applied to capacitor C during the first and second intervals respectively, the moving tape is retarded by some preselected time segment relative to the reference clock in a manner similar to that previously described when the retard command is applied to set flip-flop 28.

What I claim is:

1. A replay system for use with a recorded medium, said system comprising a medium driving means for initially moving said recorded medium at its normal velocity, input means for receiving an external reference clock, and control means coupled to said driving means and to said input means for receiving an external reference clock for changing the velocity of the recorded medium from the normal replay velocity during a first interval and immediately thereafter changing the velocity of the recorded medium back to the normal replay velocity during a second interval of equal duration with said first interval to thereby temporarily step the velocity of the recorded medium relative the normal playback velocity within specific reference clock and position increments.

2. The replay system of claim 1 wherein the velocity of the recorded medium is changed at a constant rate during both of said first and second intervals.

3. The replay system of claim 1 wherein the recorded medium is accelerated during said first interval and decelerated during said second interval to advance it relative to said reference clock.

4. The replay system of claim 1 wherein the recorded medium is decelerated during said first interval and accelerated during said second interval to retard it relative to said reference clock.

5. A video replay system for use with a recorded medium, said system comprising input means for receiving an external reference clock signal, a medium driving means for initially moving said recorded medium at its normal replay velocity with a recorded correlating frequency thereon phase locked to said external reference clock signal of the same frequency, and control means coupled to said driving means and to said input means for receiving an external reference clock signal for changing the velocity of the recorded medium from the normal replay velocity during a first interval and immediately thereafter changing the velocity of the recorded medium back to the normal replay velocity during a second interval of equal duration with said first interval to thereby temporarily step the velocity of the recorded medium relative to the normal playback velocity by a preselected time segment relative to the external reference clock signal and within specified reference clock and position sequence increments.

6. The video replay system of claim 5 wherein the cumulative duration of said first and second intervals corresponds with a multiple of the external reference clock period, and the tape moves during this cumulative duration through two periods of the recorded correlating frequency.

7. The replay system of claim 6 wherein the recorded medium is tape and said medium driving means comprises a capstan drive transport mechanism to pull the tape, said transport mechanism being driven by a motor of the type the speed of which is proportional to the frequency of its input signal, said control means including a voltage controlled oscillator having an output applied at the input to said motor, said voltage controlled oscillator having the voltage level across a capacitor applied to its input throughout the cumulative duration of said first and second intervals, said voltage level being controlled by a logic network through a switch which either applies a current source or a current sink to said capacitor in accelerating or decelerating the tape respectively during said first or second intervals.

8. The video replay system of claim 7 wherein the duration of said first interval is determined by applying a count of output pulses from a capstan tachometer to control said logic network and the duration of said second interval is determined by disabling said logic network when the output frequency of said voltage controlled oscillator returns to the input frequency of said motor at the replay velocity of said tape.

* * * * *